United States Patent
Wongsasulux et al.

(10) Patent No.: US 11,005,363 B1
(45) Date of Patent: May 11, 2021

(54) RESONANT POWER CONVERTER AND CURRENT SYNTHESIZING METHOD THEREFOR

(71) Applicant: Delta Electronics (Thailand) Public Company Limited, Samutprakarn (TH)

(72) Inventors: Jakrapong Wongsasulux, Samutprakarn (TH); Savit Tipprecha, Samutprakarn (TH); Kamolnut Benjanarasut, Samutprakarn (TH)

(73) Assignee: DELTA ELECTRONICS (THAILAND) PUBLIC COMPANY LIMITED, Samutprakarn (TH)

( * ) Notice: Subject to any disclaimer, the term of this patent is extended or adjusted under 35 U.S.C. 154(b) by 0 days.

(21) Appl. No.: 16/843,767

(22) Filed: Apr. 8, 2020

(51) Int. Cl.
*H02M 3/335* (2006.01)
*H02M 1/42* (2007.01)

(52) U.S. Cl.
CPC ................. *H02M 1/4241* (2013.01)

(58) Field of Classification Search
CPC ............ H02M 3/335; H02M 3/33507; H02M 3/33538; H02M 3/33546; H02M 2007/4815; H02M 7/53846; H02M 1/4241
See application file for complete search history.

(56) References Cited

U.S. PATENT DOCUMENTS

| | | | |
|---|---|---|---|
| 6,381,159 B2 | 4/2002 | Oknaian et al. | |
| 7,440,298 B2 | 10/2008 | Yang | |
| 8,406,018 B2 * | 3/2013 | Liang | H02M 3/3376 363/56.04 |
| 8,704,455 B2 | 4/2014 | Choi et al. | |
| 8,823,352 B2 | 9/2014 | Zhang | |
| 9,983,606 B2 | 5/2018 | Yang et al. | |
| 2008/0266908 A1 * | 10/2008 | Halberstadt | H02M 3/3376 363/21.02 |
| 2011/0149607 A1 * | 6/2011 | Jungreis | H02M 3/3376 363/21.02 |
| 2013/0307511 A1 | 11/2013 | De Vries | |
| 2014/0339916 A1 * | 11/2014 | Fells | H02J 50/60 307/104 |
| 2015/0381055 A1 * | 12/2015 | Ohtake | H02M 3/33507 363/21.02 |
| 2018/0241253 A1 * | 8/2018 | Hoshino | H02J 50/12 |

* cited by examiner

*Primary Examiner* — Gary L Laxton
(74) *Attorney, Agent, or Firm* — Kirton McConkie; Evan R. Witt

(57) ABSTRACT

A resonant power converter and a current synthesizing method therefor are provided. The resonant power converter includes a switch circuit, a resonant tank, a transformer, a rectifier circuit, and a current synthesizing module. The switch circuit receives an input voltage from an input source, and the rectifier circuit outputs an output voltage to a load. The current synthesizing module includes a sensing circuit, a peak hold circuit, and a calculation unit. The sensing circuit is configured to sense a resonant capacitor voltage on a resonant capacitor of the resonant tank. The peak hold circuit is configured to receive the resonant capacitor voltage and acquires a peak value thereof. The calculation unit is configured to receive the peak value, a switching frequency, the input voltage, the output voltage, and a resonant capacitance of the resonant power converter and generate a synthesized output current accordingly.

10 Claims, 3 Drawing Sheets

RESONANT POWER CONVERTER AND CURRENT SYNTHESIZING METHOD THEREFOR

FIELD OF THE INVENTION

The present disclosure relates to a resonant power converter, and more particularly to a resonant power converter and a current synthesizing method therefor.

BACKGROUND OF THE INVENTION

Most of power supplies need output current information for fault detection or system monitoring purpose. Since the current shape of the PWM converter is either triangular or trapezoidal, the output current information can also be obtained through sensing the current from primary side. In addition, the average value of the output current can be easily calculated.

For resonant converters, since the current shape is sinusoidal with harmonics, the output current information conventionally cannot be obtained by sensing the current from primary side directly. Moreover, it requires very complex computation to derive the average value of the output current from the peak value of the output current.

Therefore, there is a need of providing a resonant power converter and a current synthesizing method therefor to obviate the drawbacks encountered from the prior arts.

SUMMARY OF THE INVENTION

It is an objective of the present disclosure to provide a resonant power converter and a current synthesizing method therefor. The output current of the resonant power converter is synthesized based on the input voltage, the output voltage, the resonant capacitor voltage, and the resonant capacitance of the resonant power converter. Therefore, the obtained output current is prevented from being affected by noise or harmonics.

In accordance with an aspect of the present disclosure, there is provided a resonant power converter. The resonant power converter includes a switch circuit, a resonant tank, a transformer, a rectifier circuit, and a current synthesizing module. The switch circuit, the resonant tank, the transformer, and the rectifier circuit are connected sequentially. The switch circuit is adapted to receive an input voltage from an input source, and the rectifier circuit is adapted to output an output voltage to a load. The current synthesizing module includes a sensing circuit, a peak hold circuit, and a calculation unit. The sensing circuit is configured to sense a resonant capacitor voltage on a resonant capacitor of the resonant tank. The peak hold circuit is electrically connected to the sensing circuit for receiving the resonant capacitor voltage. The peak hold circuit is configured to acquire a peak value of the resonant capacitor voltage. The calculation unit is electrically connected to the peak hold circuit. The calculation unit is configured to receive the peak value, a switching frequency, the input voltage, the output voltage, and a resonant capacitance of the resonant power converter and generate a synthesized output current accordingly.

In accordance with another aspect of the present disclosure, there is provided a current synthesizing method for a resonant power converter. The current synthesizing method includes steps of: (a) sensing a resonant capacitor voltage on a resonant capacitor of the resonant tank; (b) acquiring a peak value of the resonant capacitor voltage; and (c) generating a synthesized output current according to the peak value, a switching frequency, the input voltage, the output voltage, and a resonant capacitance of the resonant power converter.

DETAILED DESCRIPTION OF THE PREFERRED EMBODIMENT

Figure 1:
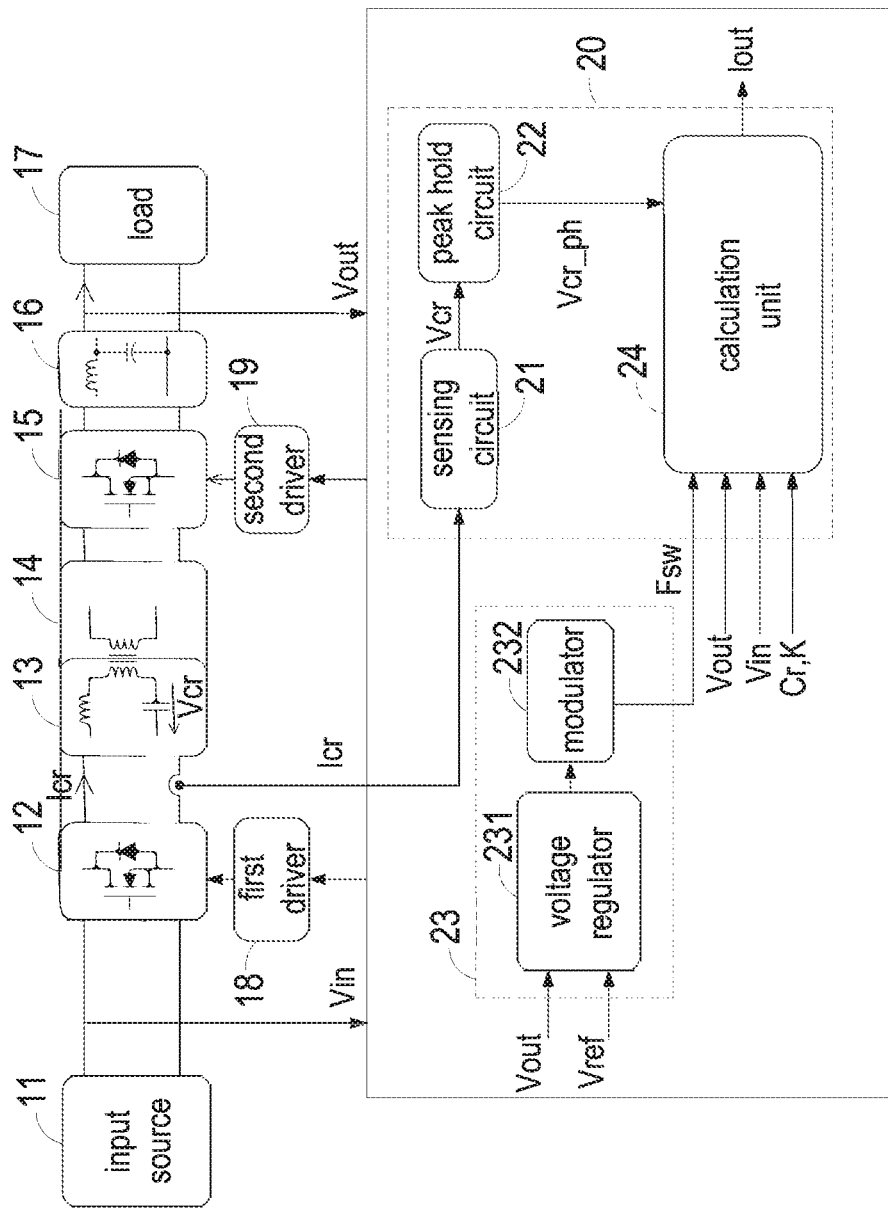
FIG. 1 is a schematic circuit diagram illustrating a resonant power converter according to an embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items. While the numerical ranges and parameters set forth for the broad scope of the present invention are approximations, the numerical value reported in the specific examples set forth as accurately as possible. However, any numerical values inherently contain certain errors necessarily the standard deviation found in the respective testing measurements caused. Also, as used herein, the term "about" generally means away from a given value or a range of 10%, 5%, 1% or 0.5%. Alternatively, the word "about" means within an acceptable standard error of ordinary skill in the art-recognized average. In addition to the operation/working examples, or unless otherwise specifically stated otherwise, in all cases, all of the numerical ranges, amounts, values and percentages, such as the number for the herein disclosed materials, time duration, temperature, operating conditions, the ratio of the amount, and the like, should be understood as the word "about" decorator. Accordingly, unless otherwise indicated, the numerical parameters of the present invention and scope of the appended patent proposed is to follow changes in the desired approximations. At least, the number of significant digits for each numerical parameter should at least be reported and explained by conventional rounding technique is applied. Herein, it can be expressed as a range between from one endpoint to the other or both endpoints. Unless otherwise specified, all ranges disclosed herein are inclusive.

FIG. 1 is a schematic circuit diagram illustrating a resonant power converter according to an embodiment of the present disclosure. As shown in FIG. 1, the resonant power converter includes a switch circuit 12, a resonant tank 13, a transformer 14, a rectifier circuit 15, and a current synthesizing module 20. Preferably but not exclusively, in the embodiment, the resonant power converter is a half-bridge or full-bridge resonant converter. The switch circuit 12, the resonant tank 13, the transformer 14, and the rectifier circuit 15 are connected sequentially. The switch circuit 12 is adapted to receive an input voltage Vin from an input source 11. The rectifier circuit 15 is adapted to output an output voltage Vout to a load 17. The resonant tank 13 includes a resonant inductor and a resonant capacitor connected in series. The transformer 14 is for example but not limited to an isolation transformer.

The current synthesizing module 20 includes a sensing circuit 21, a peak hold circuit 22, and a calculation unit 24. The sensing circuit 21 is configured to sense a resonant capacitor voltage Vcr on the resonant capacitor of the resonant tank 13. The peak hold circuit 22 is electrically connected to the sensing circuit 21 for receiving the resonant capacitor voltage Vcr. The peak hold circuit 22 is configured to acquire a peak value Vcr_ph of the resonant capacitor voltage Vcr. The calculation unit 24 is electrically connected to the peak hold circuit 22 for receiving the peak value Vcr_ph of the resonant capacitor voltage Vcr. In addition, the calculation unit 24 is adapted to receive a switching frequency Fsw, the input voltage Vin, the output voltage Vout, and a resonant capacitance Cr of the resonant power converter. The calculation unit 24 is configured to generate a synthesized output current Tout according to the peak value Vcr_ph, the switching frequency Fsw, the input voltage Vin, the output voltage Vout, and the resonant capacitance Cr of the resonant power converter. Consequently, the output current of the resonant power converter is obtained, and the above process of synthesizing the output current prevents the obtained output current from being affected by noise or harmonics. The synthesized output current Tout may be utilized for fault detection and system monitoring purpose.

In an embodiment, the sensing circuit 21 may acquire the resonant capacitor voltage Vcr by directing measuring the voltage across the resonant capacitor. Alternatively, the sensing circuit 21 may acquire the resonant capacitor voltage Vcr through the resonant capacitor current Icr. Namely, the sensing circuit 21 may sense the resonant capacitor current Icr on the resonant capacitor, and the sensing circuit 21 may convert the resonant capacitor current Icr to the resonant capacitor voltage Vcr by equation (1).

$$Vcr = \frac{1}{Cr}\int Icr\, dt \qquad (1)$$

The total charge transfer per switching cycle can be achieved from the resonant capacitor voltage Vcr by equation (2), where $\Delta Qr$ is the total charge transfer per switching cycle, C is the total capacitance of the resonant power converter, and $\Delta Vcr$ is the difference between the minimum and maximum resonant capacitor voltage in a switching cycle.

$$\Delta Qr = C\Delta Vcr \qquad (2)$$

Moreover, the synthesized output current Tout is obtained through equation (3), where K is the efficiency coefficient of the resonant power converter.

$$Iout = \frac{[K * Vin * Fsw * Cr * (2 * Vcr - Vin)]}{Vout} \qquad (3)$$

In an embodiment, the resonant power converter further includes a regulation circuit 23 electrically connected to the calculation unit 24, and the regulation circuit 23 is configured for receiving the output voltage Vout and a reference voltage Vref and outputting the switching frequency Fsw to the calculation unit 24. In an embodiment, the regulation circuit 23 includes a voltage regulator 231 and a modulator 232. The voltage regulator 231 and the modulator 232 are electrically connected to each other. The voltage regulator 231 is adapted to receive and compare the output voltage Vout and the reference voltage Vref, and the voltage regulator 231 is configured to output a regulation signal based on the comparing result. The modulator 232 is adapted to receive the regulation signal and output the switching frequency Fsw accordingly. For example but not exclusively, the modulator 232 is adapted to perform a digital pulse width modulation.

In an embodiment, the current synthesizing module 20 may be implemented by at least one of a Micro Control Unit (MCU) and a digital signal processor (DSP). In an embodiment, the regulation circuit 23 and the current synthesizing module 20 may be integrated together.

In an embodiment, the resonant power converter further includes a first driver 18 and a second driver 19. The first driver 18 is electrically connected to the switch circuit 12 and the current synthesizing module 20, and the first driver 18 is adapter to drive and control the switch circuit 12. The second driver 19 is electrically connected to the rectifier circuit 15 and the current synthesizing module 20, and the second driver 19 is adapted to drive and control the rectifier circuit 15. The current synthesizing module 20 is adapted to generate a first driving signal and a second driving signal according to the synthesized output current Iout. The first driver 18 may receive the first driving signal, and the first driver 18 is adapted to drive the switch circuit 12 according to the first driving signal. The second driver 19 may receive the second driving signal, and the second driver 19 is adapted to drive the rectifier circuit 15 according to the second driving signal.

In an embodiment, the resonant power converter further includes a filter circuit 16 electrically connected between the rectifier circuit 15 and the load 17. The filter circuit 16 is adapted to filter the output of resonant power converter.

Figure 2:
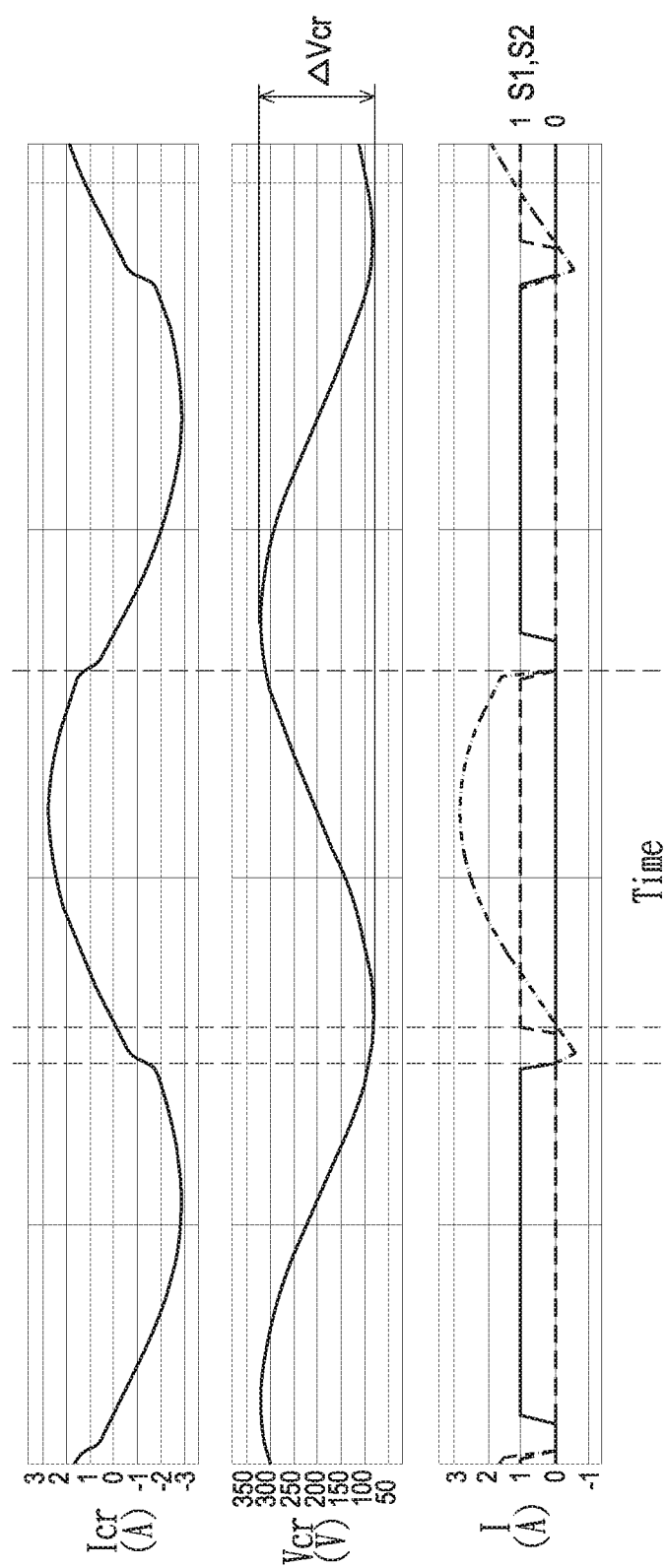
FIG. 2 is a schematic oscillogram showing the waveform of the resonant power converter of FIG. 1.

FIG. 2 schematically shows the waveforms of some parameters and signals of the half-bridge resonant power converter. The corresponding waveforms of the full-bridge resonant power converter may be drived accordingly and are omitted herein. As shown in FIG. 2, FIG. 2 schematically shows the waveforms of the resonant capacitor current Icr, the resonant capacitor voltage Vcr, the gate drive signals S1 and S2 of the switches in the switch circuit 12, and the current I of the switch circuit. It is noted that the gate drive signals S1 and S2 for the switch circuit 12 are depicted in dashed line and solid line respectively, and the current I in the switch circuit 12 is depicted in chain line. Meanwhile, the difference Δ Vcr between the minimum and maximum resonant capacitor voltage in a switching cycle is shown in FIG. 2.

Figure 3:
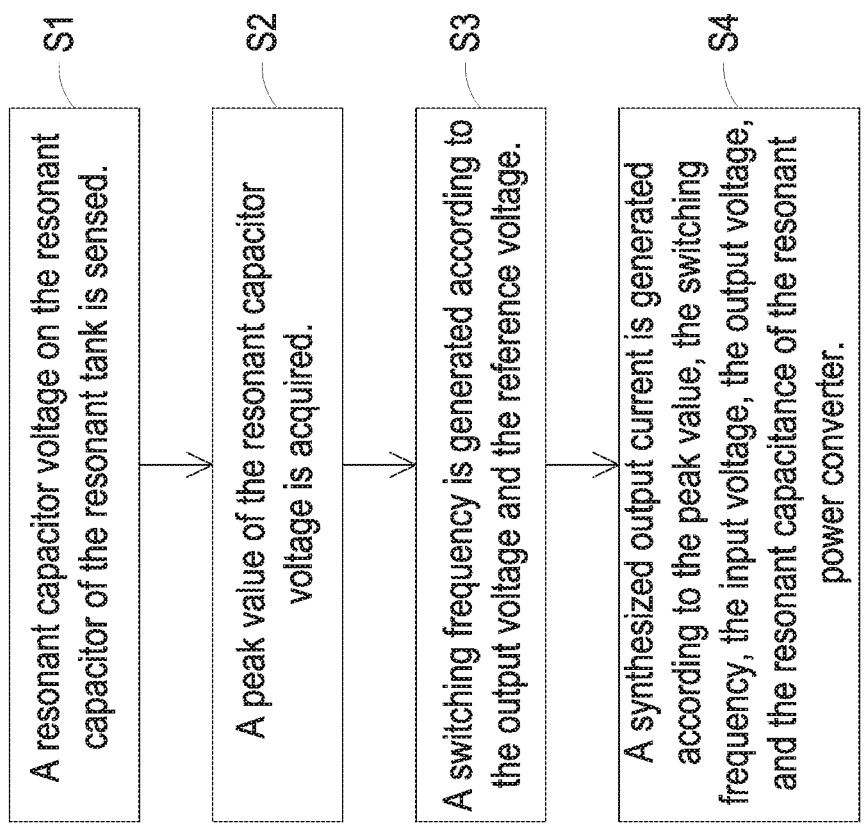
FIG. 3 is a flowchart illustrating a current synthesizing method for a resonant power converter according to an embodiment of the present disclosure.

FIG. 3 is a flowchart illustrating a current synthesizing method for a resonant power converter according to an embodiment of the present disclosure. The current synthesizing method shown in FIG. 3 can be applied to the resonant power converter shown in FIG. 1. As shown in FIG. 3, the current synthesizing method includes the following steps.

First, in the step S1, a resonant capacitor voltage Vcr on the resonant capacitor of the resonant tank 13 is sensed. In an embodiment, a resonant capacitor current Icr on the resonant capacitor is sensed, and the resonant capacitor current Icr is converted to the resonant capacitor voltage Vcr.

Then, in the step S2, a peak value Vcr_ph of the resonant capacitor voltage Vcr is acquired.

Finally, in the step S4, a synthesized output current Iout is generated according to the peak value Vcr_ph, the switching frequency Fsw, the input voltage Vin, the output voltage Vout, and the resonant capacitance Cr of the resonant power converter.

In an embodiment, the current synthesizing method further includes a step S3. In the step S3, the switching frequency Fsw is generated according to the output voltage Vout and the reference voltage Vref. In an embodiment, a regulation signal is generated according to the output voltage Vout and the reference voltage Vref, and the switching frequency Fsw is generated according to the regulation signal.

In an embodiment, the current synthesizing method further includes a step of generating a first driving signal according to the synthesized output current Tout and driving the switch circuit 12 according to the first driving signal. In an embodiment, the current synthesizing method further includes a step of generating a second driving signal according to the synthesized output current Tout, and driving the rectifier circuit 15 according to the second driving signal.

From the above descriptions, the present disclosure provides a resonant power converter and a current synthesizing method therefor. The output current of the resonant power converter may be synthesized based on the input voltage, the output voltage, the resonant capacitor voltage, and the resonant capacitance of the resonant power converter. Therefore, the obtained output current may be prevented from being affected by noise or harmonics, and the synthesized output current can be utilized for fault detection and system monitoring purpose.

While the disclosure has been described in terms of what is presently considered to be the most practical and preferred embodiments, it is to be understood that the disclosure needs not be limited to the disclosed embodiment.

What is claimed is:

1. A resonant power converter, comprising:
   a switch circuit, a resonant tank, a transformer, and a rectifier circuit connected sequentially, wherein the switch circuit is adapted to receive an input voltage from an input source, and the rectifier circuit is adapted to output an output voltage to a load; and
   a current synthesizing module, comprising:
      a sensing circuit configured to sense a resonant capacitor voltage on a resonant capacitor of the resonant tank;
      a peak hold circuit electrically connected to the sensing circuit for receiving the resonant capacitor voltage, wherein the peak hold circuit is configured to acquire a peak value of the resonant capacitor voltage; and
      a calculation unit electrically connected to the peak hold circuit, wherein the calculation unit is configured to receive the peak value, a switching frequency, the input voltage, the output voltage, and a resonant capacitance of the resonant power converter and generate a synthesized output current accordingly.

2. The resonant power converter according to claim 1, wherein the sensing circuit is configured to sense a resonant capacitor current on the resonant capacitor and convert the resonant capacitor current to the resonant capacitor voltage.

3. The resonant power converter according to claim 1, further comprising a regulation circuit electrically connected to the calculation unit, wherein the regulation circuit comprises a voltage regulator and a modulator electrically connected to each other, the voltage regulator is configured to receive the output voltage and a reference voltage and output a regulation signal, and the modulator is configured to receive the regulation signal and output the switching frequency to the calculation unit.

4. The resonant power converter according to claim 1, further comprising a first driver electrically connected to the switch circuit and the current synthesizing module, wherein the current synthesizing module is adapted to generate a first driving signal according to the synthesized output current, the first driver is adapted to receive the first driving signal and drive the switch circuit according to the first driving signal.

5. The resonant power converter according to claim 1, further comprising a second driver electrically connected to the rectifier circuit and the current synthesizing module, wherein the current synthesizing module is adapted to generate a second driving signal according to the synthesized output current, the second driver is adapted to receive the second driving signal and drive the rectifier circuit according to the second driving signal.

6. A current synthesizing method for a resonant power converter, wherein the resonant power converter comprises a switch circuit, a resonant tank, a transformer, and a rectifier circuit connected sequentially, the switch circuit is adapted to receive an input voltage from an input source, and the rectifier circuit is adapted to output an output voltage to a load, the current synthesizing method comprising:

(a) sensing a resonant capacitor voltage on a resonant capacitor of the resonant tank;
(b) acquiring a peak value of the resonant capacitor voltage; and
(c) generating a synthesized output current according to the peak value, a switching frequency, the input voltage, the output voltage, and a resonant capacitance of the resonant power converter.

7. The current synthesizing method according to claim 6, wherein in the step (a), a resonant capacitor current on the resonant capacitor is sensed, and the resonant capacitor current is converted to the resonant capacitor voltage.

8. The current synthesizing method according to claim 6, further comprising a step (d) before the step (c), wherein in the step (d), a regulation signal is generated according to the output voltage and a reference voltage, and the switching frequency is generated according to the regulation signal.

9. The current synthesizing method according to claim 6, further comprising:
(e) generating a first driving signal according to the synthesized output current, and driving the switch circuit according to the first driving signal.

10. The current synthesizing method according to claim 6, further comprising:
(f) generating a second driving signal according to the synthesized output current, and driving the rectifier circuit according to the second driving signal.

\* \* \* \* \*